(12) United States Patent
Liu (10) Patent No.: US 8,339,612 B2
(45) Date of Patent: Dec. 25, 2012

(54) SHAPE-MEASURING INTERFEROMETER HAVING LOW-COHERENCE SOURCE CONJUGATE TO THE EXAMINED OBJECT

(75) Inventor: Zhigiang Liu, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/780,826

(22) Filed: May 14, 2010

(65) Prior Publication Data
US 2010/0220336 A1    Sep. 2, 2010

Related U.S. Application Data

(63) Continuation of application No. PCT/JP2008/070974, filed on Nov. 19, 2008.

(30) Foreign Application Priority Data

Nov. 19, 2007  (JP) ................................ P2007-298744

(51) Int. Cl.
*G01B 11/02*    (2006.01)
(52) U.S. Cl. ....................................................... 356/497
(58) Field of Classification Search .................. 356/479, 356/497
See application file for complete search history.

(56) References Cited

U.S. PATENT DOCUMENTS

| | | | | |
|---|---|---|---|---|
| 5,923,466 A | * | 7/1999 | Krause et al. | 359/389 |
| 7,319,229 B2 | * | 1/2008 | Vaez-Iravani et al. | 250/372 |
| 7,460,248 B2 | * | 12/2008 | Kurtz et al. | 356/521 |

FOREIGN PATENT DOCUMENTS

| | | |
|---|---|---|
| JP | 08-252256 | 10/1996 |
| JP | 2002-191060 | 7/2002 |
| JP | 2005-017127 | 1/2005 |
| JP | 2007-298281 | 11/2007 |

OTHER PUBLICATIONS

International Search Report from corresponding International Application No. PCT/JP2008/070974, dated Jan. 20, 2009.
International Preliminary Report on Patentability and Written Opinion from corresponding International Application No. PCT/JP2008/070974, dated Jun. 8, 2010.

* cited by examiner

*Primary Examiner* — Hwa Lee
(74) *Attorney, Agent, or Firm* — Klarquist Sparkman, LLP

(57) ABSTRACT

Interferometers are provided for measuring the surface shape of an examined object or a transmitted wavefront through the examined object. An exemplary interferometer includes an area light source having a low spatial coherence property, and a light-guiding optical system configured to arrange the area light source and the examined object in an optically conjugate relation with each other.

13 Claims, 10 Drawing Sheets

SHAPE-MEASURING INTERFEROMETER HAVING LOW-COHERENCE SOURCE CONJUGATE TO THE EXAMINED OBJECT

CROSS-REFERENCE TO RELATED APPLICATIONS

This application is a continuation application of PCT/JP2008/070974, filed Nov. 19, 2008, which claims the benefit of and priority to Japan Patent Application No. 2007-298744, filed on Nov. 19, 2007. The entire contents of both priority applications are incorporated herein by reference in their respective entireties.

BACKGROUND

1. Field

Embodiments of the present invention relate to interferometers and, more particularly, to an interferometer for measuring a surface shape of an examined surface or a transmitted wavefront through an examined optical system.

2. Description of the Related Art

In conventional interferometers, a light source and an examined object (examined surface or examined optical system) are in a nonconjugate relation. For example, a point light source is used in the interferometers of almost all types including the Fizeau interferometer and the Twyman-Green interferometer, and the point light source and the examined object are not optically conjugate with each other. Furthermore, an area light source is used in the Michelson interferometer, and the area light source and the examined object are not conjugate with each other.

The conventional interferometers are limited in the range of radii of curvature of examined surfaces available for measurement by a single interferometer. In the case of the conventional interferometers, if an examined surface and a reference surface have a large difference in their surface shape, the pitch of interference fringes will become too small to measure. In order to improve the contrast of interference fringes to be detected by a sensor like a CCD, there is a proposal of the Sub-Nyquist measurement method to reduce apertures of light receiving elements of a CCD, but it is unsatisfactory because the apertures of the light receiving elements cannot be reduced to a required level in order to ensure a sufficient quantity of light. With the conventional interferometers, it is common practice to measure a surface shape of a polished optical surface and it is difficult to measure a surface shape of a scattering surface.

Embodiments of the present invention have been accomplished in view of the above-described problems and it is an object of the present invention to provide an interferometer capable of measuring a surface shape of an examined object even if there is a large difference between surface shapes of the examined surface and a reference surface. It is another aspect of an embodiment of the present invention to provide an interferometer capable of measuring a surface shape of a scattering surface.

SUMMARY

In order to solve the above problems, an embodiment of the present invention provides an interferometer for measuring a surface shape of an examined object or a transmitted wavefront through the examined object. The embodiment comprises an area light source having a low spatial coherence property, and a light-guiding optical system configured to arrange the area light source and the examined object in an optically conjugate relation with each other.

In the interferometer of an embodiment of the present invention, the examined surface (examined object) is arranged in the optically conjugate relation with the area light source, for example, consisting of a large number of micro area light sources (which will be referred to simply as "small illuminants") having low coherence with each other, i.e., the area light source having the low spatial coherence property, and therefore interference fringes are formed by interference between measurement light emitted from each small illuminant and reflected on each micro region of the examined surface and reference light emitted from the same small illuminant and reflected on a corresponding micro region of a reference surface. By detecting the phase of the interference fringes, therefore, it is feasible to determine a difference in surface shape between each micro region of the examined surface and a corresponding micro region of the reference surface and eventually to determine an overall surface shape across a required region of the examined surface.

With the interferometer of an embodiment of the present invention, as described above, the overall surface shape across the required region of the examined surface is determined based on differences in surface shape between micro regions of the examined surface and corresponding micro regions of the reference surface. As a result, the interferometer of the present invention is able to measure the surface shape of the examined object even if there is a large difference in surface shape between the examined surface and the reference surface. Furthermore, it is also able to measure a surface shape of the examined surface even if the examined surface is a scattering surface.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DESCRIPTION

Figure 1:
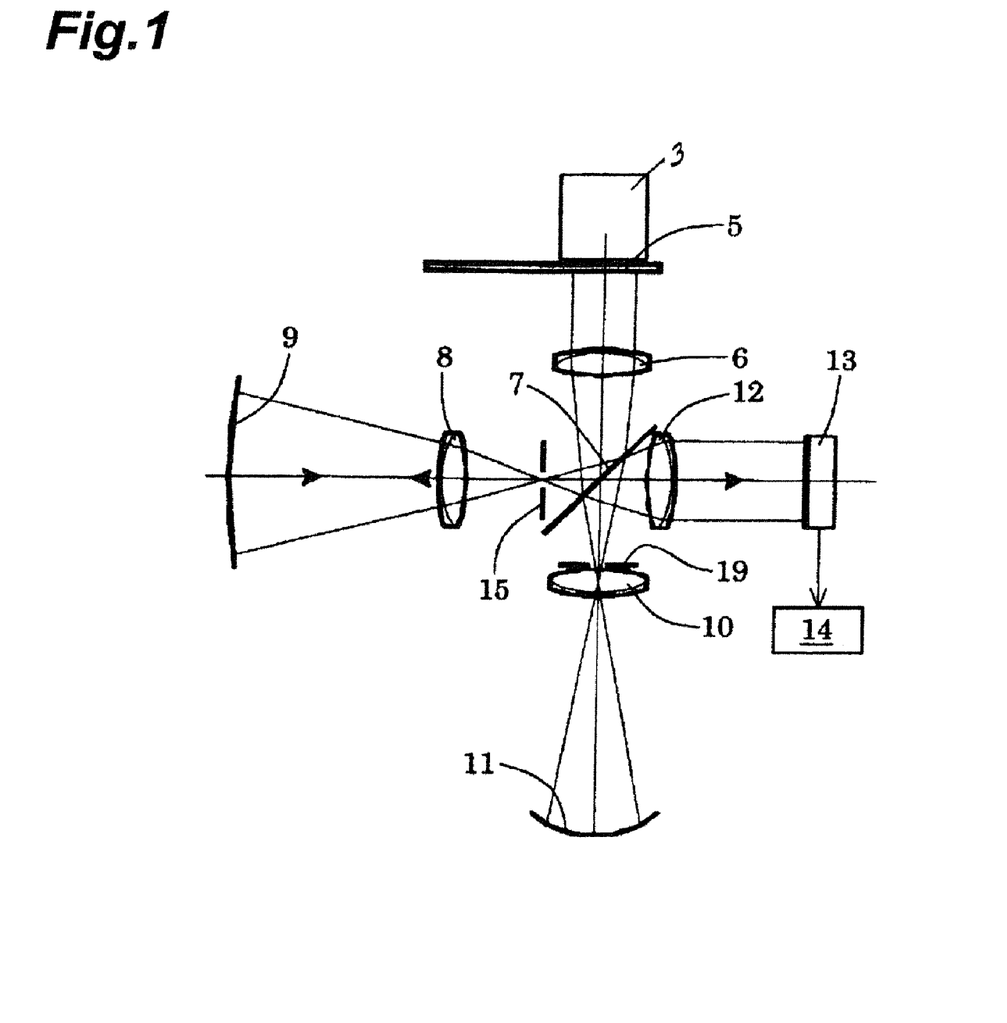
FIG. 1 is a drawing schematically showing a configuration of an interferometer according to a first embodiment.

Embodiments of the present invention will be described based on the accompanying drawings. FIG. 1 is a drawing schematically showing a configuration of an interferometer according to the first embodiment of the present invention. The first embodiment is an application of the present invention to an interferometer that measures a surface shape of an examined surface. The interferometer of the first embodiment is provided with a rotating diffuser plate 5 arranged at or near a position of a large number of small illuminants 3, for example, which are formed into an area light source using a micro lens array or fibers.

Rays from the respective small illuminants are diffused by the rotating diffuser plate 5 to reduce spatial coherency while maintaining temporal coherency, and thereafter they are incident to a collimator lens 6. The large number of small illuminants are formed at a front focus position of the collimator lens 6 and the rotating diffuser plate 5 is arranged at or near the front focus position of the collimator lens 6. Therefore, the rays from the respective small illuminants travel through the collimator lens 6 to become parallel rays and the parallel rays are incident to a half mirror (beam splitter; light splitting element) 7.

Light reflected by the half mirror 7 is limited by an aperture stop 15 arranged at a rear focus position of the collimator lens 6 and then travels through a condenser lens 8 to be focused on an examined surface (reflecting surface of an examined object) 9. Namely, the examined surface 9 is arranged at a rear focus position of the condenser lens 8 and images of the respective small illuminants are formed on the examined surface 9. Rays of measurement light reflected on the examined surface 9, i.e., rays from the respective small illuminant images formed on the examined surface 9, travel through the condenser lens 8 to become approximately parallel rays that pass through the aperture stop 15 to return to the half mirror 7.

On the other hand, light transmitted by the half mirror 7 is restricted by an aperture stop 19 arranged at a rear focus position of the collimator lens 6 and then travels through a condenser lens 10 to be focused on a reference surface 11. Namely, the reference surface 11 is arranged at a rear focus position of the condenser lens 10 and images of the respective small illuminants are formed on the reference surface 11. Rays of reference light reflected on the reference surface 11, i.e., rays from the respective small illuminant images, formed on the reference surface 11, travel through the condenser lens 10 to become approximately parallel rays and that they pass through the aperture stop 19 to return to the half mirror 7.

The rays of measurement light transmitted by the half mirror 7 and reference light reflected by the half mirror 7 travel through an imaging lens 12 to reach an image sensor (photodetector) 13, for example, like a two-dimensional CCD, and form a large number of small illuminant images thereon. In this manner, interference occurs on a sensor surface of the image sensor 13 between the rays of measurement light emitted from the respective small illuminants and reflected on respective micro regions of the examined surface 9 and the rays of reference light emitted from the same small illuminants and reflected on corresponding micro regions of the reference surface 11 to form interference fringes thereon.

The output from the image sensor 13 is fed to a signal processor 14. The signal processor 14 analyzes the interference fringes formed on the sensor surface of the image sensor 13, thereby to measure the surface shape of the examined surface 9. Specifically, the signal processor 14 detects the phase of the interference fringes to determine a difference in surface shape between each micro region of the examined surface 9 and a corresponding micro region of the reference surface 11 and eventually to determine an overall surface shape across a required region of the examined surface 9.

In the interferometer of the first embodiment, the large number of small illuminants, for example, formed using a micro lens array or the like, and the rotating diffuser plate 5 constitute an area light source having a low spatial coherence property. This area light source is positioned at the front focus position of the collimator lens 6 and the examined surface 9 is positioned at the rear focus position of the condenser lens 8. Therefore, the area light source and the examined surface 9 are arranged in an optically conjugate relation with each other by a light-guiding optical system consisting of the collimator lens 6 and the condenser lens 8. As described above, a light beam from each small illuminant forms an image of the small illuminant on each micro region of the examined surface 9 and a light beam from the same small illuminant forms an image of the small illuminant on a corresponding micro region of the reference surface 11.

The measurement light beam from the small illuminant image on each micro region of the examined surface 9 and the reference light beam from the small illuminant image on the corresponding micro region of the reference surface 11 interfere with each other to form interference fringes. The phase of the interference fringes is detected to determine a difference in surface shape between each micro region of the examined surface 9 and the corresponding micro region of the reference surface 11 and eventually to determine an overall surface shape of the examined surface 9. Since the interferometer of the first embodiment is configured to determine the overall surface shape of the examined surface 9 on the basis of the difference in surface shape between each micro region of the examined surface 9 and the corresponding micro region of the reference surface 11 as described above, it is able to measure the surface shape of the examined object 9 even if there is a large difference in surface shape between the examined surface 9 and the reference surface 11 and to measure the surface shape even if the examined surface 9 is a scattering surface.

Specifically, in the first embodiment, the number of interference fringes can be reduced according to the radius of curvature of the examined surface 9 by moving the examined surface 9 and the condenser lens 8 closer together along the optical axis. Namely, even if there is a relatively large difference between the radius of curvature of the examined surface 9 and the radius of curvature of the reference surface 11, the number of interference fringes can be reduced according to need by moving the examined surface 9 and the condenser lens 8 closer together along the optical axis. This, in turn, it makes the measurement of interference fringes feasible. Similarly, the number of interference fringes can also be reduced by moving the reference surface 11 and the condenser lens 10 closer together along the optical axis. This, in turn, it makes the measurement of interference fringes feasible. In the first embodiment, the phase of interference fringes can be shifted by moving at least one of the examined surface 9 and the reference surface 11 along the optical-axis direction.

In the first embodiment, the measurement light reflected on the examined surface 9 will not reach the image sensor 13 unless it passes through the aperture stop 15. In other words, it can be considered that, depending upon the surface shape of the examined surface 9, the measurement light to reach the image sensor 13 after being reflected on a certain micro region of the examined surface 9, is blocked by the aperture stop 15. In a first modification example shown in FIG. 2, the interferometer is configured so that the rays of measurement light reflected on the respective micro regions of the examined surface 9 can certainly reach the image sensor 13, independent of the surface shape of the examined surface 9.

Figure 2:
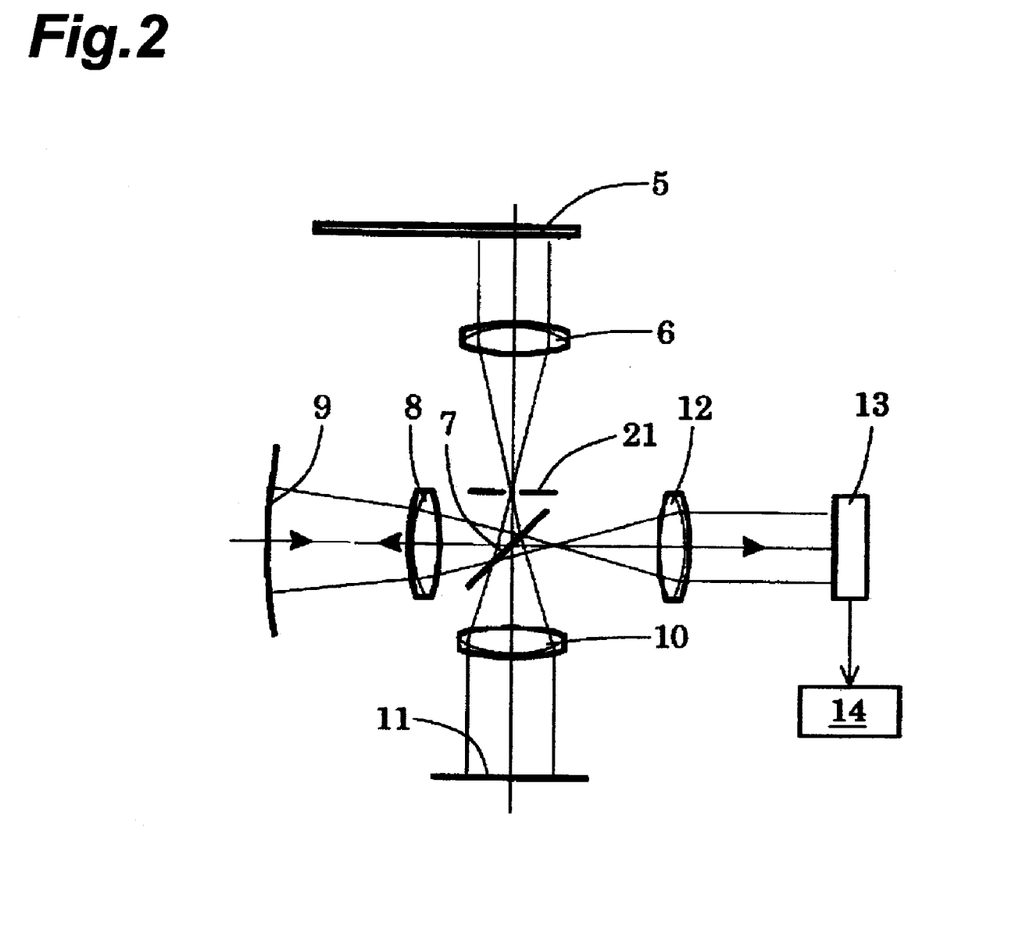
FIG. 2 is a drawing schematically showing a configuration of an interferometer according to a first modification example of the first embodiment.

In the interferometer according to the first modification example, the rays from the respective small illuminants travel through the collimator lens 6 to become parallel rays, they are limited by an aperture stop 21 arranged at the rear focus position of the collimator lens 6, and then they are incident to the half mirror 7. Light reflected by the half mirror 7 travels through the condenser lens 8 to form images of the respective small illuminants on the examined surface 9. The measurement light from each small illuminant image formed on the examined surface 9 travels through the condenser lens 8, half mirror 7, and imaging lens 12 to reach the image sensor 13.

Light transmitted by the half mirror 7 travels through the condenser lens 10 to form images of the respective small illuminants on the reference surface 11. The reference light from each small illuminant image formed on the reference surface 11 travels via the condenser lens 10, half mirror 7, and imaging lens 12 to reach the image sensor 13. In this manner, interference occurs on the sensor surface of the image sensor 13 between the reference light emitted from each small illuminant and reflected on each micro region of the examined surface 9 and the reference light emitted from the same small illuminant and reflected on the corresponding micro region of the reference surface 11 to form interference fringes thereon.

In the first modification example of FIG. 2, different from the embodiment of FIG. 1, there is no aperture stop arranged in the optical path from the examined surface 9 to the image sensor 13 or in the optical path from the reference surface 11 to the image sensor 13. Therefore, the rays of measurement light reflected on the respective micro regions of the examined surface 9 certainly reach the image sensor 13, independent of the surface shape of the examined surface 9. As a consequence, accurate interference fringes can be obtained on the sensor surface of the image sensor 13 even if there is a large slope component of the difference in surface shape between the examined surface 9 and the reference surface 11.

However, as the difference becomes larger between the surface shape of the examined surface 9 and the surface shape of the reference surface 11, the pitch of the interference fringes formed on the sensor surface of the image sensor 13 becomes finer. In that case, the contrast of the interference fringes can be improved by placing a mask with apertures smaller than an area of each pixel, over surfaces of respective pixels of the image sensor 13. In the first modification example of FIG. 2, by adjusting the space between the condenser lens 8 and the aperture stop 21, measurement can be performed even if there is a relatively large difference between the curvature of the examined surface 9 and the curvature of the reference surface 11. Namely, a spherical shape of the examined surface 9 can be measured even if the reference surface 11 is planar.

Figure 3:
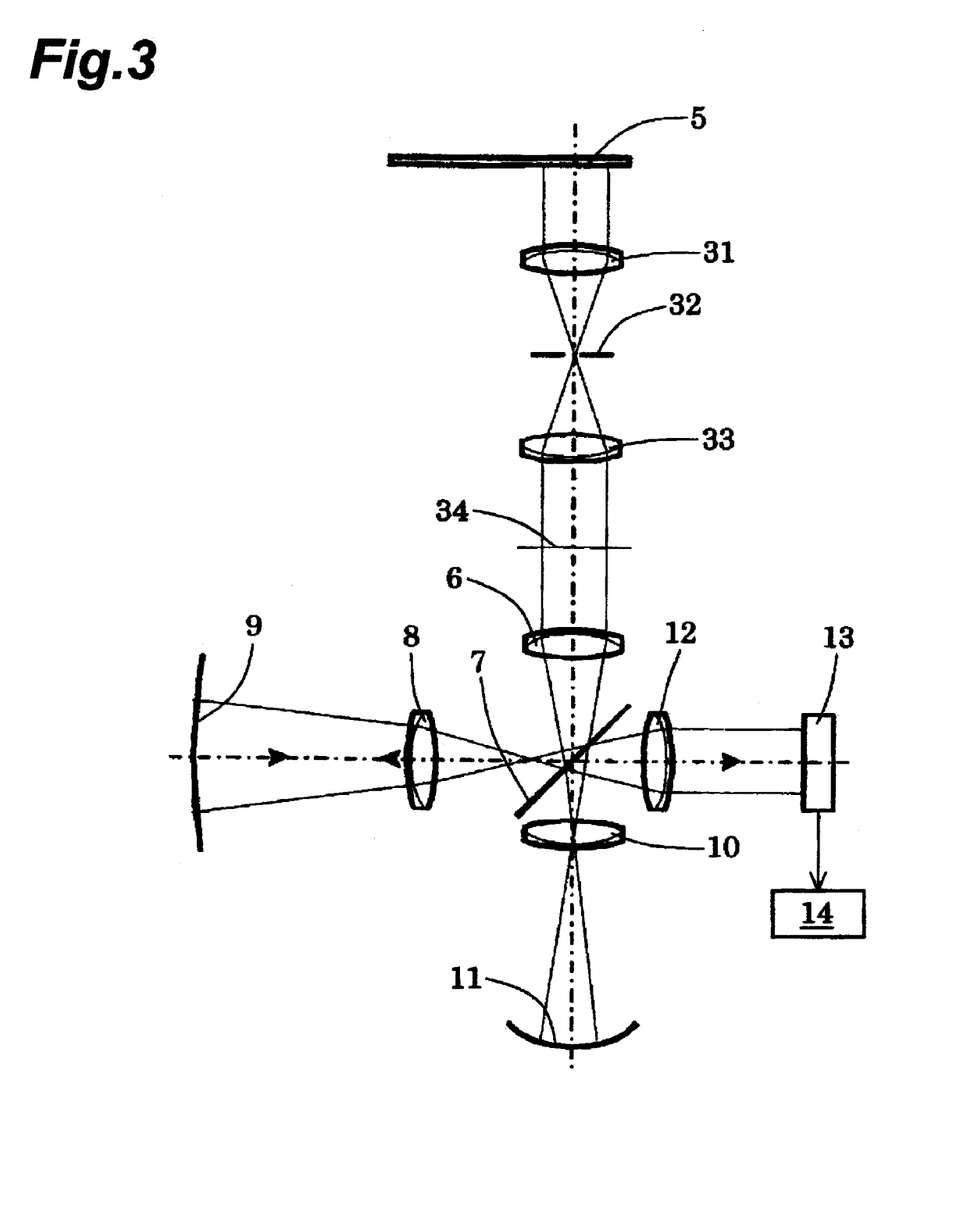
FIG. 3 is a drawing schematically showing a configuration of an interferometer according to a second modification example of the first embodiment.

Based on the configuration of a second modification example shown in FIG. 3, it is also feasible to make the measurement light, reflected on each micro region of the examined surface 9, certainly reach the image sensor 13, independent of the surface shape of the examined surface 9. With reference to FIG. 3, in the interferometer according to the second modification example, light from a laser light source not shown, travels through the rotating diffuser plate 5 to be incident to a lens 31. The rotating diffuser plate 5 is arranged at a front focus position of the lens 31. The light traveling through the lens 31 illuminates an aperture stop 32 arranged at a rear focus position of the lens 31.

The light passing through the aperture stop 32 travels through a lens 33 to form an area light source 34 having a low spatial coherence property. The aperture stop 32 is arranged at a front focus position of the lens 33, and the area light source 34 is formed on a rear focal plane of the lens 33. The area light source 34 is a continuous area light source, but it can be regarded as an area light source 34 consisting of a large number of micro area light sources (small illuminants) having low coherence with each other and densely arrayed.

Rays from the respective small illuminants forming the area light source 34 travel via the collimator lens 6, half mirror 7, and condenser lens 8 to be incident to the examined surface 9. Light reflected on the examined surface 9 travels via the condenser lens 8, half mirror 7, and imaging lens 12 to reach the image sensor 13 without being limited by any aperture stop. Rays from the respective small illuminants travel via the collimator lens 6, half mirror 7, and condenser lens 10 to be incident to the reference surface 11. Light reflected on the reference surface 11 travels via the condenser lens 10, half mirror 7, and imaging lens 12 to reach the image sensor 13 without being limited by any aperture stop.

Figure 4:
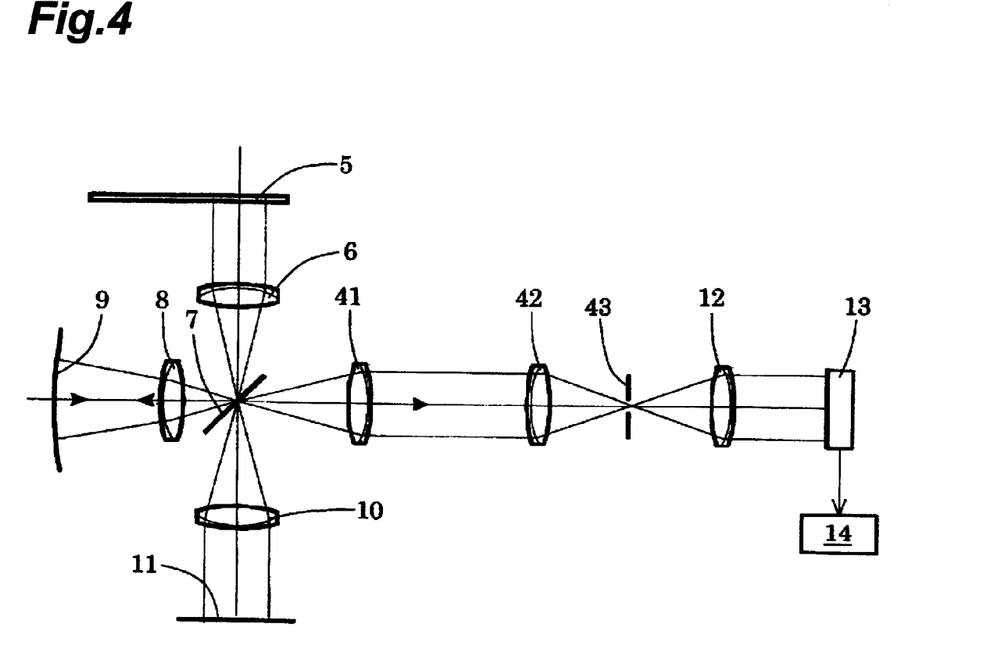
FIG. 4 is a drawing schematically showing a configuration of an interferometer according to a third modification example of the first embodiment.

It is also possible to adopt a modification example, as shown in FIG. 4, wherein an aperture stop 43 is arranged to limit both the measurement light and the reference light in the optical path from the examined surface 9 to the image sensor 13 and in the optical path from the reference surface 11 and the image sensor 13. In the interferometer according to the third modification example shown in FIG. 4, the measurement light from the examined surface 9 travels via the condenser lens 8, the half mirror 7, and a lens 41 to enter a lens 42. The measurement light passing through the lens 42 is limited by the aperture stop 43 arranged at a rear focus position of the lens 42 and then travels through the imaging lens 12 to reach the image sensor 13.

Similarly, the reference light from the reference surface 11 travels via the condenser lens 10, half mirror 7, lens 41, lens 42, aperture stop 43, and imaging lens 12 to reach the image sensor 13. In the third modification example, the space between the lens 41 and the lens 42 is set to be equal to the sum of the focal length of the lens 41 and the focal length of the lens 42. The sensor surface of the image sensor 13 is arranged at the rear focus position of the imaging lens 12.

Figure 5:
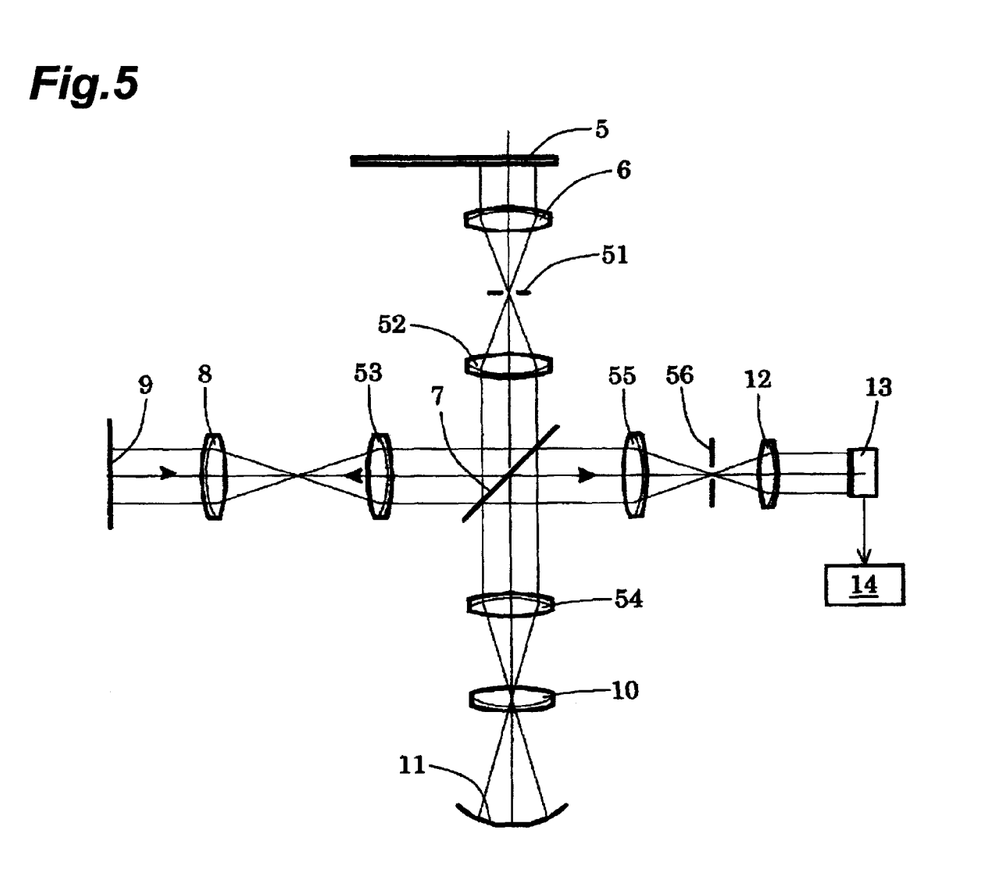
FIG. 5 is a drawing schematically showing a configuration of an interferometer according to a fourth modification example of the first embodiment.

It is also possible to adopt a modification example, as shown in FIG. 5, wherein light is limited by a respective aperture stop in the optical path from the area light source to the examined surface 9 and the reference surface 11 and in the optical path from the examined surface 9 and the reference surface 11 to the image sensor 13. In the interferometer according to the fourth modification example shown in FIG. 5, the rays of the respective small illuminants travel through the collimator lens 6 to become parallel rays to illuminate the aperture stop 51 arranged at the rear focus position of the collimator lens 6. Light passing through the aperture stop 51 travels through a lens 52 to be incident to the half mirror 7. The aperture stop 51 is arranged at a front focus position of the lens 52. Light reflected by the half mirror 7 travels via a lens 53 and the condenser lens 8 to form images of the respective small illuminants on the examined surface 9.

Light transmitted by the half mirror 7 travels via a lens 54 and the condenser lens 10 to form images of the respective small illuminants on the reference surface 11. The space between the lens 52 and the lens 53 is set to be equal to the sum of the focal length of the lens 52 and the focal length of the lens 53. The space between the lens 52 and the lens 54 is set to be equal to the sum of the focal length of the lens 52 and the focal length of the lens 54.

The measurement light from each small illuminant image formed on the examined surface 9 travels via the condenser lens 8, lens 53, and half mirror 7 to enter a lens 55. The measurement light passing through the lens 55 illuminates an aperture stop 56 arranged at a rear focus position of the lens 55. The measurement light passing through the aperture stop 56 travels through the imaging lens 12 to reach the image sensor 13. The reference light from each small illuminant image formed on the reference surface 11 travels via the condenser lens 10, lens 54, half mirror 7, lens 55, aperture stop 56, and imaging lens 12 to reach the image sensor 13.

The space between the lens 53 and the lens 55 is set to be equal to the sum of the focal length of the lens 53 and the focal length of the lens 55. The space between the lens 54 and the lens 55 is set to be equal to the sum of the focal length of the lens 54 and the focal length of the lens 55. The aperture stop 56 is arranged at the front focus position of the imaging lens 12.

In the above-described first to fourth modification examples, just as in the case of the first embodiment of FIG. 1, even if there is a relatively large difference between the radius of curvature of the examined surface 9 and the radius of curvature of the reference surface 11, the number of interference fringes can be reduced according to need by moving the examined surface 9 and the condenser lens 8 closer together along the optical axis. This in turn it makes the measurement of interference fringes feasible. Similarly, the number of interference fringes can also be reduced by moving the reference surface 11 and the condenser lens 10 closer together along the optical axis. This, in turn, makes the measurement of interference fringes feasible.

Figure 6:
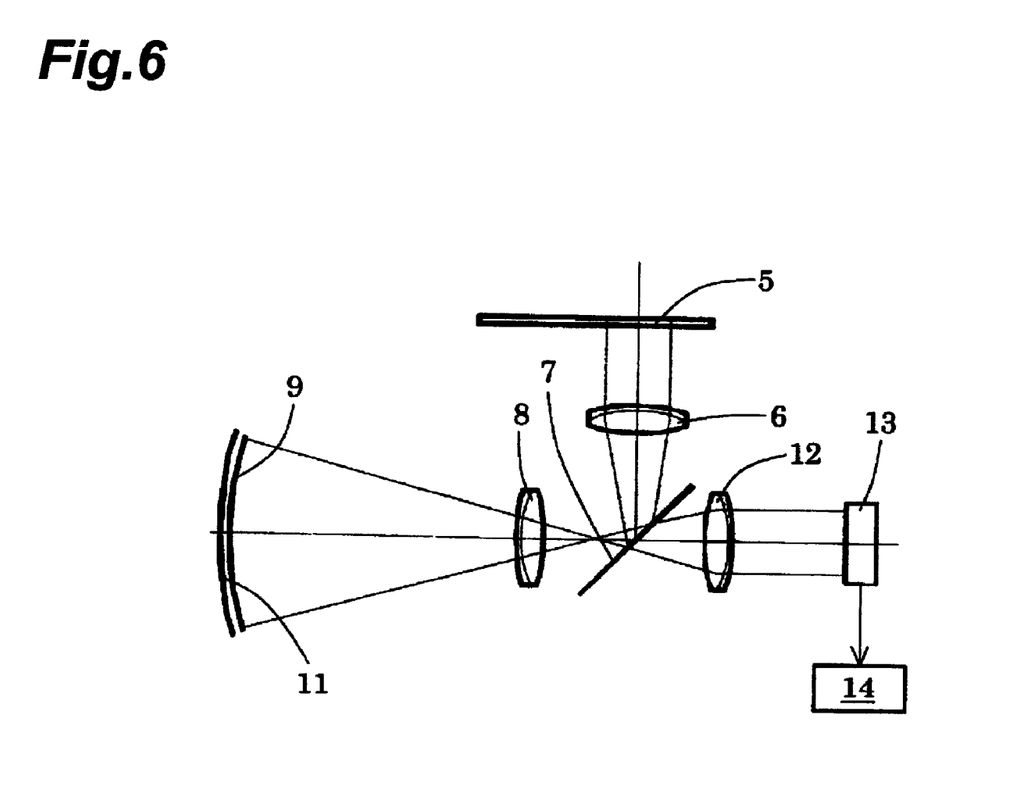
FIG. 6 is a drawing schematically showing a configuration of an interferometer according to a fifth modification example of the first embodiment.

The first embodiment is the application of the present invention to the interferometer of the configuration similar to the Twyman-Green interferometer. However, without having to be limited to it, the present invention is also applicable to an interferometer of a configuration similar to the Fizeau interferometer, for example, as shown in FIG. 6. The present invention is also applicable to interferometers similar to the Mach-Zehnder interferometer, the Shearing interferometer, and so on.

An interferometer according to a fifth modification example in FIG. 6 has a configuration similar to the interferometer according to the first embodiment of FIG. 1, but is basically different from the first embodiment in that the reference surface 11 is arranged in proximity to the examined surface 9. The configuration and action of the fifth modification example in FIG. 6 will be described below with focus on the difference from the first embodiment.

In the interferometer according to the fifth modification example in FIG. 6, rays from the respective small illuminants travel via the rotating diffuser plate 5 and collimator lens 6 to be incident to the half mirror 7. Light reflected by the half mirror 7 travels through the condenser lens 8 to be focused on the examined surface 9. The measurement light reflected on the examined surface 9 travels through the condenser lens 8 to return to the half mirror 7.

Light transmitted by the examined surface 9 is focused on the reference surface 11 arranged immediately behind and in proximity to the examined surface 9. The reference light reflected on the reference surface 11 travels through the examined surface 9 and the condenser lens 8 to return to the half mirror 7. Rays of the measurement light and the reference light transmitted by the half mirror 7 travel through the imaging lens 12 to form interference fringes on the sensor surface of the image sensor 13. The signal processor 14 measures the surface shape of the examined surface 9, based on the output from the image sensor 13.

In the fifth modification example of FIG. 6, as in the first embodiment of FIG. 1, interference occurs between the measurement light emitted from each small illuminant and reflected on each micro region of the examined surface 9 and the reference light emitted from the same small illuminant and reflected on the corresponding micro region of the reference surface 11 to form interference fringes. The phase of the interference fringes is detected to determine the difference in surface shape between each micro region of the examined surface 9 and the corresponding micro region of the reference surface 11 and, in turn, to determine the overall surface shape of the examined surface 9.

Therefore, the fifth modification example of FIG. 6 permits the surface shape of the examined object 9 to be measured even if there is a large difference in surface shape between the examined surface 9 and the reference surface 11 and also permits the surface shape to be measured even if the examined surface 9 is a scattering surface. The fifth modification example of FIG. 6 shows the configuration wherein the reference surface 11 is arranged immediately behind and in proximity to the examined surface 9, but, without having to be limited to this, it is also possible to adopt a configuration wherein the examined surface 9 is arranged immediately behind and in proximity to the reference surface 11.

Figure 7:
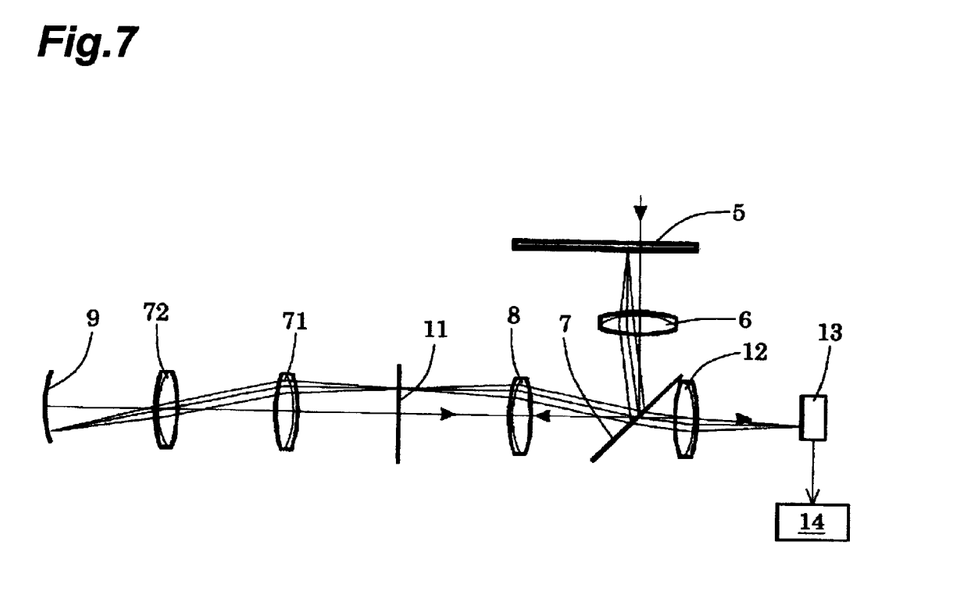
FIG. 7 is a drawing schematically showing a configuration of an interferometer according to a sixth modification example of the first embodiment.

Furthermore, it is also possible to adopt a configuration, as shown in FIG. 7, wherein the examined surface 9 is arranged on the back side of the reference surface 11 and wherein the examined surface 9 and the reference surface 11 are arranged in an optically conjugate relation with each other by a pair of lenses 71 and 72. In the sixth modification example of FIG. 7, the rays from the respective small illuminants travel via the rotating diffuser plate 5, collimator lens 6, half mirror 7, and condenser lens 8 to be focused on the reference surface 11.

Light transmitted by the reference surface 11 travels through the lenses 71 and 72 to be focused on the examined surface 9. The measurement light reflected on the examined surface 9 travels through the lens 72, lens 71, reference surface 11, condenser lens 8, half mirror 7, and imaging lens 12 to reach the image sensor 13. The reference light reflected on the reference surface 11 travels through the condenser lens 8, half mirror 7, and imaging lens 12 to reach the image sensor 13.

In the above-described first embodiment and modification examples, if the examined surface 9 is significantly different from an appropriate shape (shape suitable for the measurement with the interferometer), principal rays of measurement light may not be always perpendicular to the surface across the whole of examined surface 9. There is also a possibility that the rays from the area light source cannot be focused at the same time across the whole of examined surface 9. Namely, there is a case where the surface shape of the entire examined surface 9 cannot be measured simultaneously with high accuracy. In this case, the examined surface 9 and the condenser lens 8 are moved (or shifted) together along the optical-axis direction to move a region where principal rays are perpendicular to the face of the examined surface 9, whereby measurement is carried out only in the region suitable for the measurement or in a partial region under a good condition. By repeating the measurement of partial region while moving the examined surface 9 and the condenser lens 8 together along the optical-axis direction, the surface shape of the entire examined surface 9 can be measured with high accuracy.

It is also possible to adopt the following technique: the condenser lens 8, arranged in front of the examined surface 9, is moved along the optical-axis direction to change the condition for the light from the light source surface to be focused on the surface of the examined surface 9, and thereby to move the range in which measurement can be performed under an appropriate condition. Measurement of such partial regions is carried out, and the surface shape of the entire examined surface 9 is measured by wavefront synthesis technology. Furthermore, there is an advantage that the optical path length of the measurement light is invariant even with movement of the condenser lens 8, arranged in front of the examined surface 9, along the optical-axis direction. It is also possible to adopt the following technique: the vertical relationship, between principal rays and the examined surface or the conjugate relation between the area light source and the examined surface, is adjusted by moving the examined surface 9 in the direction perpendicular to the optical axis or by inclining it relative to the optical-axis direction. The measurement is carried out only in partial regions suitable for the measurement, and then the surface shape of the entire examined surface is calculated by wavefront synthesis.

For example, as the area light source consisting of the large number of small illuminants is moved in the direction perpendicular to the optical axis, the images of the small illuminants formed on the face of the examined surface 9 move, and measurement points on the examined surface 9 move eventually. The transverse resolution of measurement can also be improved by scanning the measurement points on the examined surface as described above.

Figure 8:
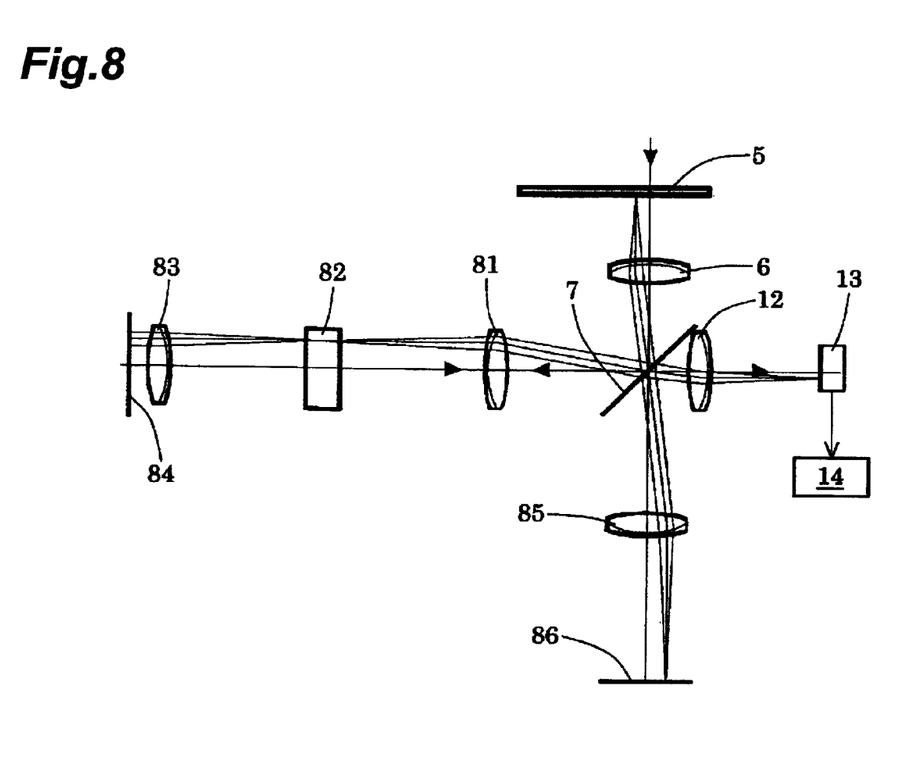
FIG. 8 is a drawing schematically showing a configuration of an interferometer according to a second embodiment.

FIG. 8 is a drawing schematically showing a configuration of an interferometer according to the second embodiment of the present invention. The second embodiment is an application of the present invention to an interferometer that measures a transmitted wavefront through an optically transparent examined optical system (optical system as an examined object), for example, like a plane-parallel plate, a lens, or a lens group. In the interferometer of the second embodiment, as in the first embodiment of FIG. 1, rays from the respective small illuminants (not shown) travel via the rotating diffuser plate 5 and collimator lens 6 to be incident to the half mirror 7.

Light reflected by the half mirror 7 travels through a condenser lens 81 to be focused once in an examined optical system 82. Namely, the examined optical system 82 is arranged at a rear focus position of the condenser lens 81, and images of the large number of small illuminants are formed in the examined optical system 82. Rays from the respective small illuminant images formed in the examined optical system 82 travel through a collimator lens 83 to become approximately parallel rays and that they are incident to a plane mirror 84. Light reflected on the plane mirror 84 travels through the collimator lens 83 to again form images of the large number of small illuminants in the examined optical system 82.

The light from each small illuminant image re-formed in the examined optical system 82, i.e., the measurement light that having made a round trip in the examined optical system 82, travels through the condenser lens 81 to return to the half mirror 7. On the other hand, light transmitted by the half mirror 7 travels through a condenser lens 85 to be focused on a reference surface 86. Namely, the reference surface 86 is arranged at a rear focus position of the condenser lens 85, and images of the large number of small illuminants are formed on the reference surface 86. The reference light reflected on the reference surface 86 travels through the condenser lens 85 to become approximately parallel rays and that they return to the half mirror 7.

The rays of measurement light transmitted by the half mirror 7 and reference light reflected by the half mirror 7 travel through the imaging lens 12 to reach the image sensor 13 and interfere with each other on the sensor surface thereof to form interference fringes. The signal processor 14 analyzes the interference fringes formed on the sensor surface of the image sensor 13 to measure the transmitted wavefront through the examined optical system 82.

In the interferometer of the second embodiment, as described above, the light from each of the large number of small illuminants makes a round trip in the examined optical system 82 while forming the image of the small illuminant in the examined optical system 82, and thereafter it interferes with the reference light on the sensor surface of the image sensor 13 to form interference fringes. In other words, the interference fringes are formed by the measurement light emitted from each small illuminant and transmitted by each micro region in the examined optical system 82 and the reference light emitted from the same small illuminant and reflected on a corresponding micro region of the reference surface 86.

The signal processor 14 detects the phase of the interference fringes to determine a difference between the wavefront in each micro region in the examined optical system 82 and the wavefront in the corresponding micro region of the reference surface 86 and eventually to determine the transmitted wavefront through the examined optical system 82.

In the second embodiment, the phase of the interference fringes can be shifted by moving at least one of the examined optical system 82 and the reference surface 86 along the optical-axis direction. Furthermore, optical adjustment of the interferometer can be performed by moving the examined optical system 82 and the condenser lens 81 closer together along the optical axis.

The second embodiment is the application of the present invention to the interferometer of the configuration similar to the Twyman-Green interferometer. However, without having to be limited to this, the present invention is also applicable to interferometers similar to the Fizeau interferometer, the Mach-Zehnder interferometer, the Shearing interferometer, and so on.

Figure 9:
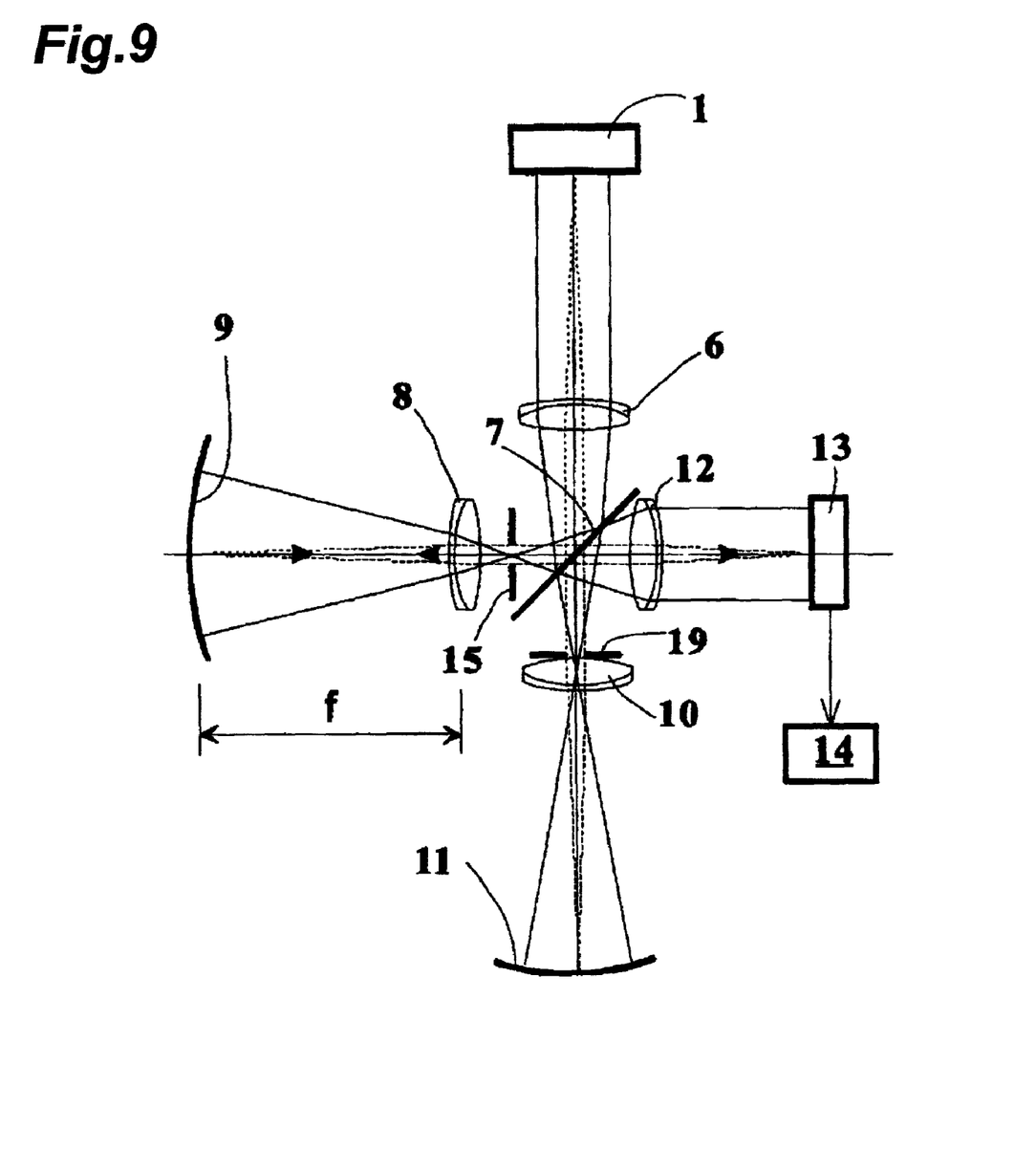
FIG. 9 is a drawing schematically showing a configuration of an interferometer according to a third embodiment.

FIG. 9 is a drawing schematically showing a configuration of an interferometer according to the third embodiment of the present invention. The third embodiment is an application of the present invention to the interferometer that measures a surface shape of an examined surface. The interferometer of the third embodiment is provided with an area light source 1 having a low spatial coherence property, for example, like a mercury lamp or the like.

Light emitted from each position of the area light source 1 is incident to the collimator lens 6. The area light source 1 is arranged at or near the front focus position of the collimator lens 6. Therefore, for example, as indicated by dotted lines in the drawing, rays from each position of the area light source 1 travel through the collimator lens 6 to become parallel rays and that they are incident to the half mirror (beam splitter; light splitting element) 7.

Light reflected by the half mirror 7 is limited by the aperture stop 15 arranged at the rear focus position of the collimator lens 6 and then travels through the condenser lens 8 to be focused on the examined surface (reflecting surface of an examined object) 9. Namely, the examined surface 9 is arranged at the rear focus position of the condenser lens 8, and an image of the area light source is formed on the examined surface 9. The measurement light reflected on the examined surface 9 travels through the condenser lens 8 to become approximately parallel rays and that they pass through the aperture stop 15 to return to the half mirror 7.

On the other hand, light transmitted by the half mirror 7 is limited by the aperture stop 19 arranged at the rear focus position of the collimator lens 6 and then travels through the condenser lens 10 to be focused on the reference surface 11. Namely, the reference surface 11 is arranged at the rear focus position of the condenser lens 10, and an image of the area light source 1 is formed on the reference surface 11.

The reference light reflected on the reference surface 11 travels through the condenser lens 10 to become approximately parallel rays and that they pass through the aperture stop 19 to return to the half mirror 7.

The rays of measurement light transmitted by the half mirror 7 and reference light reflected by the half mirror 7 travel through the imaging lens 12 to reach the image sensor (photodetector) 13, for example, like a two-dimensional CCD to form images of the area light source, the examined surface, and the reference surface. In this manner, the measurement light beam emitted from each position of the area light source 1 and reflected on the examined surface 9 and the reference light beam emitted from the same position of the area light source 1 and reflected on the reference surface 11 interfere with each other on the sensor surface of the image sensor 13 to form interference fringes thereon.

The output from the image sensor 13 is fed to the signal processor 14. The signal processor 14 analyzes the interference fringes formed on the sensor surface of the image sensor 13, for example, by the fringe scan method or by the Fourier transform method to measure the surface shape of the examined surface 9. Specifically, the signal processor 14 detects the phase of the interference fringes to determine the difference between the surface shapes of the examined surface 9 and the reference surface 11 and eventually to determine an overall surface shape across a required region of the examined surface 9.

The interferometer of the third embodiment is provided with the area light source 1 having the low spatial coherence property. This area light source 1 is positioned at the front focus position of the collimator lens 6, and the examined surface 9 is positioned at the rear focus position of the condenser lens 8. Therefore, the area light source 1 and the examined surface 9 are arranged in an optically conjugate relation with each other by a light-guiding optical system consisting of the collimator lens 6, and the condenser lens 8. In this manner, light from each position of the area light source 1 forms an image of the position of the area light source 1 at each position of the examined surface 9, and light from the same position of the area light source 1 forms an image of the position of the area light source 1 at each corresponding position of the reference surface 11.

Interference occurs between the measurement light from the area light source image at each position of the examined surface 9 and the reference light from the area light source image at each corresponding position of the reference surface 11 to form interference fringes. The phase of the interference fringes is detected to determine the difference between the surface shapes of the examined surface 9 and the reference surface 11 and eventually to determine the overall surface shape of the examined surface 9. Since the interferometer of the third embodiment is configured to determine the overall surface shape of the examined surface 9 on the basis of the difference between the surface shapes of the examined surface 9 and the reference surface 11 as described above, it is able to measure the surface shape of the examined object 9 even if the difference is large between the surface shapes of the examined surface 9 and the reference surface 11, and able to measure the surface shape even if the examined surface 9 is a scattering surface.

Specifically, in the third embodiment, the number of interference fringes can be reduced according to the radius of curvature of the examined surface 9 by moving the examined surface 9 and the condenser lens 8 closer together along the optical axis. Namely, even if there is a relatively large difference between the radius of curvature of the examined surface 9 and the radius of curvature of the reference surface 11, the number of interference fringes can be reduced according to need by moving the examined surface 9 and the condenser lens 8 closer together along the optical axis and, in turn, it makes the measurement of interference fringes feasible. Similarly, by moving the reference surface 11 and the condenser lens 10 closer together along the optical axis, it also becomes feasible to reduce the number of interference fringes and, in turn, to measure the interference fringes. In the third embodiment, the phase of the interference fringes can be shifted by moving at least one of the examined surface 9 and the reference surface 11 along the optical-axis direction.

The third embodiment uses the area light source 1 having the low spatial coherence property, such as the mercury lamp. But, without having to be limited to this, it is also possible to configure the area light source having the low spatial coherence property by means of a rotating diffuser plate or a rotating CGH similar to the rotating diffuser plate. For example, the area light source having the low spatial coherence property may be configured using a large number of small illuminants made using a point light source supplying a laser beam and a micro lens array or the like, and the rotating diffuser plate.

The degree of the low spatial coherence property is such that no interference occurs between rays coming from respective positions (portions) of the area light source corresponding to different pixels of the sensor surface of the image sensor 13. That no interference occurs means that the rays do not interfere with each other at all or that, even if rays do interfere, the contrast of interference fringes is sufficiently small (in other words, it is lower than one gradation of the image sensor, or the influence on measurement is smaller than a required accuracy).

Figure 10:
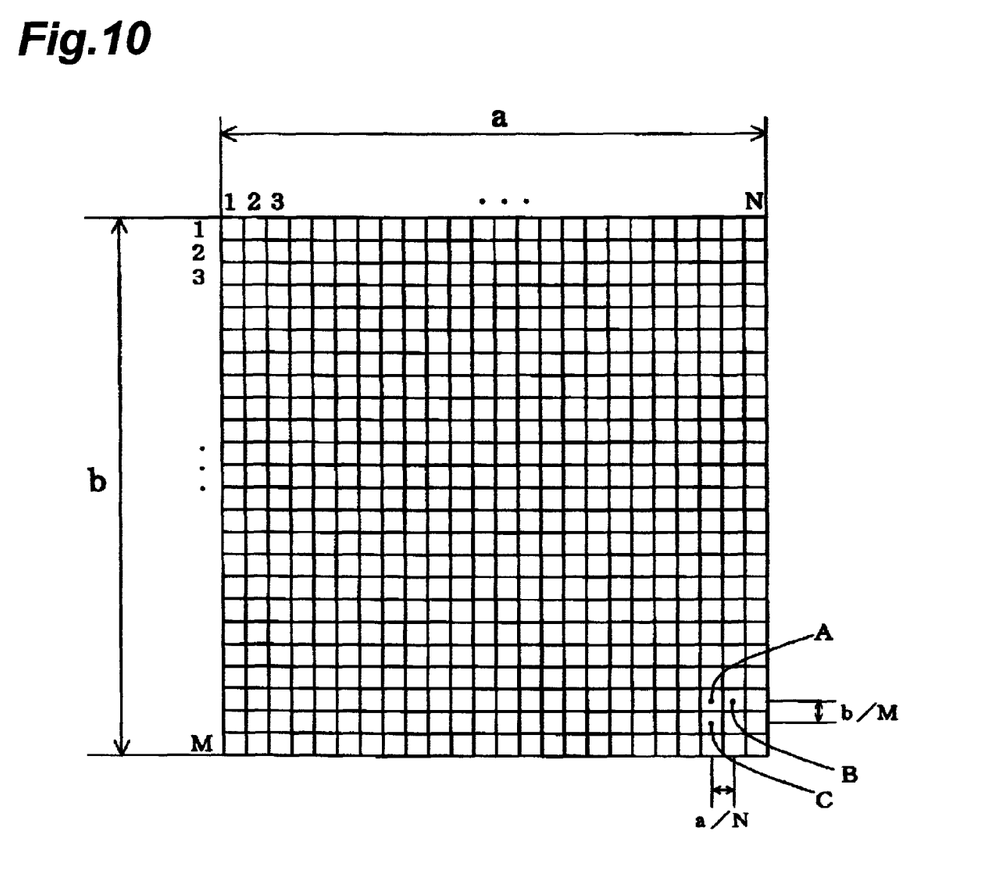
FIG. 10 is a drawing schematically showing a relation between effective pixels of a sensor surface of an image sensor and an effective area of an area light source.

FIG. 10 is a drawing schematically showing a relation between effective pixels of the sensor surface of the image sensor and an effective area of the area light source. Let N×M be the number of effective pixels of the sensor surface of the image sensor and a×b be an effective area of the area light source optically corresponding to the effective pixels. Then, positions distant by a length of a/N or b/M on the area light source (point A and point B, or point A and point C) are points corresponding to adjacent pixels on the sensor surface of the image sensor. Therefore, the area light source having the low spatial coherence property may be defined as an area light source such that rays from positions distant by a length of the smaller of a/N and b/M and rays from positions distant by more than the length on the area light source do not interfere with each other.

Unless the area light source satisfies the above condition (or if the area light source has a high spatial coherence property), rays from point A and point B can interfere with each other on the image sensor. The reason is that light from a point A on the area light source should be focused at point X on the image sensor, but the light from the point A on the light source can spread over a certain region by diffraction without being focused at point X only. Namely, if the area light source has such a high spatial coherence property that light from the other point B close to the point A on the area light source can reach a neighboring region of point X, the rays from point A and point B interfere with each other on the image sensor.

Particularly, when a micro lens array is used in order to produce optical spots on the area light source, beams of two spots focused by different micro lenses spread over the image sensor. When the area light source has a high spatial coherence property, the beams from the different micro lenses overlap and interfere with each other on the image sensor. The interference fringes are also affected by manufacturing errors of the micro lenses. In this case, it is infeasible to correctly measure the shape of the examined surface.

Since the interferometer of each of the embodiments and modification examples uses the area light source having the low spatial coherence property, rays from different positions of the area light source do not interfere with each other even if they overlap on the image sensor. Therefore, the shape of the examined surface can be correctly measured.

In the interferometer of each of the embodiments and modification examples, the area light source is arranged at the front focus position of the collimator lens 6, and the light from the area light source travels through the collimator lens 6 to become parallel rays. Therefore, no aberration is produced by the half mirror 7 arranged in the optical path of the parallel rays. The examined surface 9 is arranged at the rear focus position of the condenser lens 8, and the measurement light reflected on the examined surface 9 travels through the condenser lens 8 to become approximately parallel rays. Therefore, no aberration is produced by the half mirror 7 arranged in the optical path of the parallel rays. Furthermore, even in cases where the examined surface 9 has a slope component and where the measurement light beam and the reference light beam travel through different optical paths, there is very little measurement error in the surface shape of the examined object or the like.

In contrast, the conventional interferometers are configured so that the center of curvature of the examined surface is arranged at the rear focus position of the condenser lens. Therefore, with a difference in the radius of curvature of the examined surface, the space between the examined surface and the condenser lens also becomes different. In designing the condenser lens, it is impossible to remove aberration (or to keep aberration small) for all the points. In the case where the examined surface has a slope component, if the examined surface is arranged at a position where aberration is not removed, rays reflected on the examined surface will pass through optical paths differently from those of incident rays. Unless the reference surface has the same slope component as the examined surface, the rays of the measurement light and the reference light will pass through different optical paths. In this case, the aberration of the optical component in the interferometer will affect the measurement.

The third embodiment is the application of the present invention to the interferometer of the configuration similar to the Twyman-Green interferometer. However, without having to be limited to this, the present invention is also applicable to interferometers similar to the Fizeau interferometer, the Mach-Zehnder interferometer, the Shearing interferometer, and so on.

In each of the embodiments and modification examples, the light source to be used can be one supplying white light, for example, like an SLD, and the measurement can be performed by white light interferometry. Similarly, it is also possible to perform the measurement by multiple wavelength interferometry by tuning the wavelength of light from the light source or by using a plurality of light sources supplying light beams of different wavelengths.

It should be noted that the embodiments given above were described for facilitating the understanding of the present invention but not for limiting the present invention. Therefore, the elements disclosed in the above embodiments are intended to embrace all design changes and equivalents belonging to the technical scope of the present invention.

The invention is not limited to the foregoing embodiments but various changes and modifications of its components may be made without departing from the scope of the present invention. Also, the components disclosed in the embodiments may be assembled in any combination for embodying the present invention. For example, some of the components may be omitted from all components disclosed in the embodiments. Further, components in different embodiments may be appropriately combined.

What is claimed is:

1. An interferometer for measuring a surface shape of an examined object or a transmitted wavefront through the examined object, comprising:
    an area light source comprising a large number of small illuminants and a moving diffuser plate arranged at or near the illuminants such that respective rays from the illuminants pass through and are diffused by the rotating diffuser plate;
    a light-guiding optical system situated relative to the area light source and the examined object such that the area light source and examined object are in an optically conjugate relation with each other, the light-guiding optical system comprising a light-splitting element, a condenser lens, and a collimator lens, wherein the light-splitting element is situated in an optical path between the collimator lens and the condenser lens, the area light source is situated at a front focal plane of the collimator lens, the examined object is situated at a rear focal plane of the condenser lens, and light reflected by the light-splitting element passes through the condenser lens to the examined object;
    a reference surface situated relative to the light-splitting element, wherein light from the light-splitting element passes to the reference surface; and
    a photodetector having a sensor surface arranged at a position that is optically conjugate with the examined object, the photodetector detecting interference of light emitted from the area light source and reflected from respective regions of the examined object with light from the reference surface, the sensor surface comprising multiple pixels.

2. The interferometer according to claim 1, wherein, when the number of effective pixels of the sensor surface is N×M and an effective area of the area light source optically corresponding to the effective pixels is a×b, the low spatial coherence property is such that no interference occurs between rays from positions distant by a length of the smaller of a/N and b/M on the area light source.

3. The interferometer according to claim 2, further comprising a mask including, in front of each pixel of the sensor surface, an aperture smaller than an area of the pixel.

4. The interferometer according to claim 1, wherein the small-illuminant sources produce respective lights having low coherence with each other.

5. The interferometer according to claim 1, wherein the examined object and the condenser lens are movable together.

6. The interferometer according to claim 1, wherein the condenser lens is movable along an optical-axis direction of the condenser lens.

7. The interferometer according to claim 1, wherein the examined object is movable along a direction perpendicular to an optical-axis direction of the condenser lens.

8. The interferometer according to claim 1, wherein the examined object is inclinable relative to an optical-axis direction of the condenser lens.

9. The interferometer according to claim 1, wherein the area light source is movable along a direction perpendicular to an optical-axis direction of the light-guiding optical system.

10. The interferometer according to claim 1, wherein the collimator lens collimates rays from the area light source into parallel rays and makes the parallel rays incident to the condenser lens.

11. The interferometer according to claim 1, further comprising a second condenser lens, wherein the examined object is arranged at a focus position of the second condenser lens, and light from the beam-splitting element passes through the second condenser lens to the reference surface.

12. The interferometer according to claim 1, further comprising a mask including, in front of each pixel of the sensor surface, an aperture smaller than an area of a pixel of the sensor surface.

13. The interferometer according to claim 1, wherein light transmitted by the light-splitting element propagates to the reference surface from which the light is reflected as reference light back to the light-splitting element for combination and interference with the light reflected from the object.

* * * * *